United States Patent [19]

Miöen

[11] Patent Number: 4,585,477
[45] Date of Patent: Apr. 29, 1986

[54] METHOD FOR SEPARATING AND RECOVERING NICKEL AND COPPER FROM COMPLEX MATERIALS

[75] Inventor: Thomas K. Miöen, Stockholm, Sweden

[73] Assignee: Boliden Aktiebolag, Stockholm, Sweden

[21] Appl. No.: 699,506

[22] Filed: Feb. 11, 1985

Related U.S. Application Data

[63] Continuation of Ser. No. 539,628, Oct. 6, 1983, abandoned, which is a continuation of Ser. No. 403,649, filed as PCT SE 81/00334, Nov. 13, 1981, published as WO 82/01725, May 27, 1982, § 102(e) date Jul. 15, 1982, abandoned.

[30] Foreign Application Priority Data

Nov. 17, 1980 [SE] Sweden .............................. 8008053

[51] Int. Cl.[4] .................... C22B 15/00; C22B 23/00
[52] U.S. Cl. ........................................ 75/117; 75/2;
 75/72; 75/74; 75/82; 75/83; 75/101 R; 75/115;
 75/119; 75/121; 423/27; 423/35; 423/36;
 423/41; 423/42; 423/45; 423/140; 423/146;
 423/150; 423/152; 423/154; 204/108
[58] Field of Search ............... 423/41, 45, 151, 152,
 423/153, 27, 35, 36, 42, 140, 146, 150, 154;
 75/117, 101 R, 2, 72, 74, 82, 83, 115, 119, 121;
 204/108

[56] References Cited

U.S. PATENT DOCUMENTS

| | | | |
|---|---|---|---|
| 1,315,761 | 9/1919 | Coolbaugh | ............................ 423/41 |
| 1,528,209 | 3/1925 | Greenawalt . | |
| 1,844,937 | 2/1932 | Hybinette | ............................. 204/108 |
| 4,069,041 | 1/1978 | Görling et al. | ........................ 75/101 |
| 4,093,526 | 6/1978 | Blanco et al. | .......................... 204/104 |

FOREIGN PATENT DOCUMENTS

| | | |
|---|---|---|
| 892475 | 2/1972 | Canada . |
| 1082467 | 7/1980 | Canada . |
| 200467 | 5/1907 | Fed. Rep. of Germany . |
| 22259 | 11/1905 | Sweden . |
| 322632 | 4/1970 | Sweden . |
| 397204 | 10/1977 | Sweden . |

OTHER PUBLICATIONS

Hauf, N. W. and Schmidt C. G., "The Roasting and Leaching of Witwatersaand Pyrite Concentrates" J. of S. Africa Inst. of Mining and Metallurgy Aug., 1979, pp. 365–371.

*Primary Examiner*—John Doll
*Assistant Examiner*—Robert L. Stoll
*Attorney, Agent, or Firm*—Nils H. Ljungman

[57] ABSTRACT

A method of recovering copper and nickel from sulphidic minerals containing copper, nickel and iron comprises the steps of roasting the mineral, preferably to provide magnetite; sulphating, for example with sulphuric acid, sulphur trioxide, metal sulphate and/or sulphur dioxide together with oxygen; and a subsequent leaching of the sulphated material and recovery of copper from the leaching solution, for example by electrolysis. All or part of the leaching solution with its nickel content is recycled to the roasting stage, and the nickel content is removed in the form of nickel oxide together with the leaching residue, from which nickel can be recovered.

15 Claims, 1 Drawing Figure

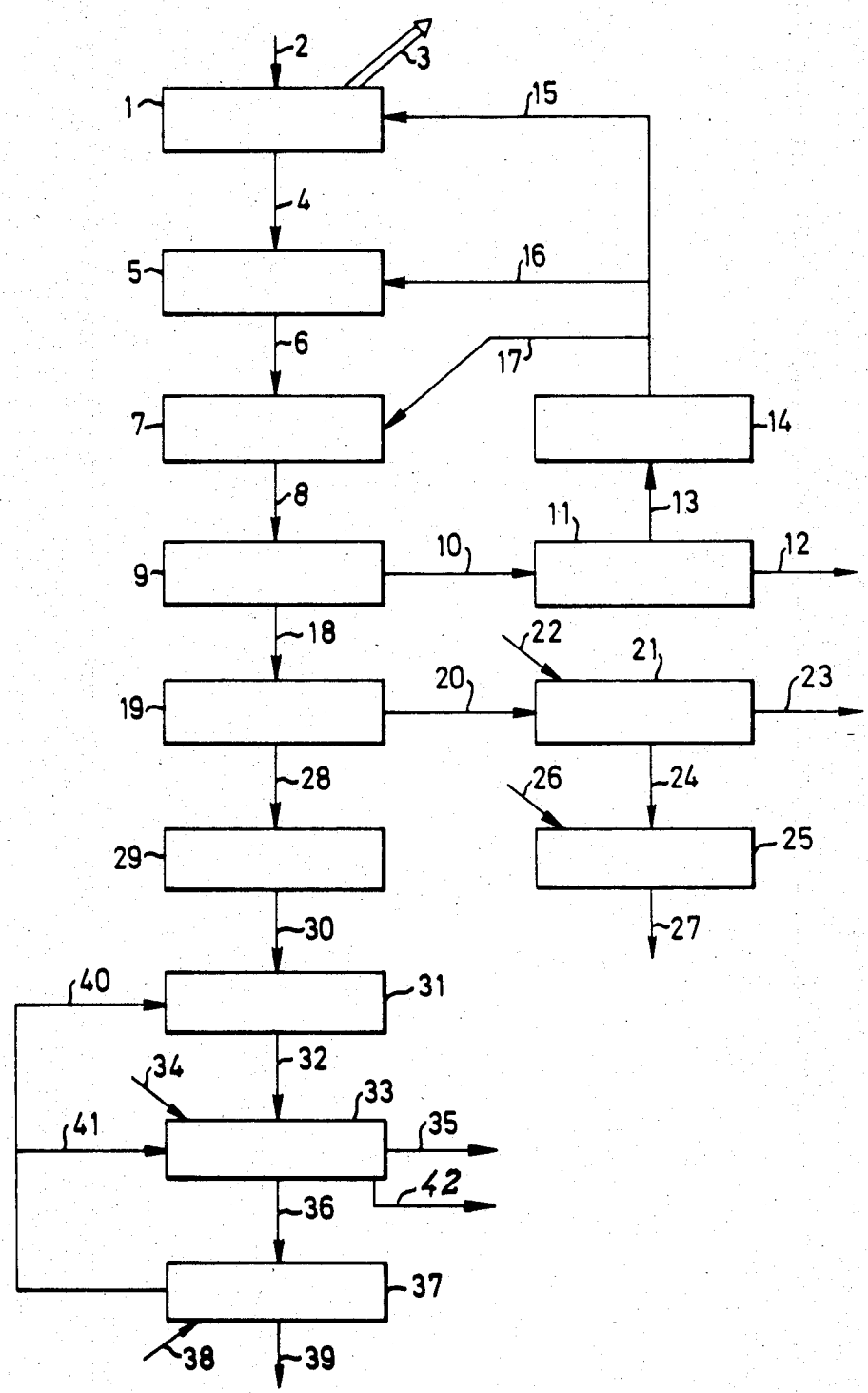

METHOD FOR SEPARATING AND RECOVERING NICKEL AND COPPER FROM COMPLEX MATERIALS

This is a continuation of the U.S. application Ser. No. 539,628, filed on Oct. 6, 1983, now abandoned, which is a continuation from Ser. No. 403,649, filed as PCT SE81/00334, on Nov. 13, 1981, published as WO82/01725 on May 27, 1982, § 102(e) date on July 15, 1982, now abandoned.

The present invention relates to a method of separating and recovering nickel and copper from complex sulphide minerals, by subjecting said minerals to roasting, sulphating and leaching processes.

The working-up of complex sulphide minerals which contain nickel and copper presents a problem which is not readily solved. A number of commonly known pyrometallurgical processes cannot readily be applied to complex sulphide minerals. Complex sulphide minerals which contain nickel almost always also contain copper and iron. Such minerals include pentlandite, chalcopyrite and pyrrhotite. When wishing to produce pure copper and nickel concentrates, the method to which one is generally referred is one involving the hydrometallurgical separation by flotation, therewith to recover a copper concentrate, a nickel concentrate and a waste comprising mainly pyrrhotite which will contain a relatively high percentage of nickel and copper.

A relatively high energy input is required to finely divide the complex concentrate when separating the individual constitutents thereof by flotation, and the separation process results in concentrates which are far too impure for direct use, without separating therefrom other, residual valuable minerals. As before indicated, pyrometallurgical methods for working-up complex sulphide minerals of the aforementioned kind present many problems, these problems being illustrated hereinafter in more detail. Thus, dead roasting results in the formation of copper and nickel ferrites which are chemically stable at elevated temperatures. Chlorinating roasting is expensive, since copper and nickel are chlorinated simultaneously and must be separated in a separate process. In the case of sulphating roasting it is difficult to sulphate nickel effectively, which results in nickel losses.

Smelting processes, for example applied when producing a matte from a complex sulphide material containing copper and nickel, also give rise to problems, owing to the fact that it is difficult to prevent nickel from passing into the iron slag, and to the fact that the copper and nickel content cannot readily be separated from the matte, and that a satisfactory yield cannot be obtained.

It will therefore be obvious that there is a need for satisfactory technique by which nickel can be recovered pyrometallurgically from complex sulphide minerals in a manner to eliminate any iron present.

It is also known to treat complex sulphide minerals containing minor quantities of nickel through a combination of sulphating roasting and leaching processes, where the mineral is roasted, sulphated and leached, whereafter copper and nickel are separated by electrolytically precipitating copper and recovering nickel sulphate from the electrolyte. As beforementioned, the disadvantage with this method is that excessively high contents of nickel remain in the leaching residue, thereby rendering the method uneconomical when the mineral contains large quantities of nickel; see for example the Canadian Patent Specification Ser. No. 1082467.

It has now been found that nickel can be economically recovered from complex sulphide minerals rich in nickel in a more satisfactory manner, by applying a new combination of procedural steps.

The novel method is set forth in the following claims.

In accordance with the novel method there is roasted a complex sulphide concentrate containing copper and nickel under conditions such as to avoid the formation of ferrites with the iron present. The roasted products or calcines are then sulphated in a separate reactor vessel under conditions lying outside the thermodynamical stability range for ferrites. The sulphating agent used is either sulphur trioxide, sulphuric acid, metal sulphates or sulphur dioxide together with oxygen. The sulphating step is known per se; see for example the Canadian Patent Specification Ser. No. 892475. During the sulphating step, the temperature is held at 600°–750° C., preferably 625°–700° C.

Thermodynamically, copper and nickel lie very close to one another and it is difficult to separate nickel and copper by selective sulphating processes carried out thermodynamically. Consequently, efforts have always previously been made to sulphate copper and nickel to the highest possible extent (Thornhill, Trans CIMM. 64:601 (1961)). It is known that nickel is difficult to sulphate, because the resultant nickel sulphate forms an impenetrable layer on the surface of the nickel-oxide grains, which inhibits further sulphating. Consequently, it has been necessary to add alkali sulphates to prevent the formation of this impenetrable nickel-sulphate skin on the nickel-oxide grains. In order to obtain a yield which is higher than 60% sulphated nickel, it is necessary to add 4–6% sodium sulphate. (Journal of the South African Institute of Mining and Metallurgy, August 1979, pages 365–371). The costs incurred by this addition of sodium sulphate makes it difficult to provide a process which is economically rewarding.

The present proposal of selectively sulphating copper and substantially leaving nickel in its oxide form is surprising to one of normal skill in this art, since it could not be expected that both copper and nickel could be recovered effectively by selectively sulphating solely copper. It is important in this respect that nickel is recovered practically completely in the process. When practising the method according to the invention, it is permissible for copper to be sulphated less effectively than considered necessary in accordance with previously known sulphating methods, in order to obtain a maintained total yield. This is less significant from the aspect of economy, since copper in the leaching residue found subsequent to the sulphating and leaching processes can be recovered together with nickel, for example as a copper-nickel-alloy, or by working-up the leaching residue in a nickel plant, for example by smelting and converting the leaching residue together with the nickel matte and/or sulphidic nickel concentrate, to form an ordinary Bessemer matte with about 20% by weight sulphur or a sulphur deficient so called high grade matte with not more than 10% sulphur and with low iron content.

The copper sulphate which has leached out is further treated in a conventional manner, by electrolysis or by cementation, to recover copper metal. Any electrolyte remaining after the electrolysis stage is returned to the roasting stage; and part of said electrolyte may also be returned to the sulphating and leaching stages. When returned to the roasting stage, sulphated nickel may be split-off to form nickel oxide. In this way the advantage is gained whereby the only nickel leaving the process is in the form of an oxide in the leaching residue obtained from the leaching stage. The leaching residue obtained when leaching-out sulphates can be treated in various ways. Thus, noble metals can be leached out, wherewith a certain quantity of nickel will also be leached out. The noble metals can be cemented out with copper or nickel metal and residual nickel in the leaching solution can be precipitated out as nickel hydroxide, by neutralizing said solution, and then returned to the roasting stage or combined with the leaching residues from the leaching stages.

The leaching residue obtained from the leaching stage or stages can suitably be dried, and melted by supplying thereto a reductant, such as carbon or oil.

In this way there is obtained an alloy containing iron, nickel and copper. If the iron is oxidised by injecting air or oxygen gas into the bath of molten iron, copper and nickel, a copper-nickel alloy will be obtained. The resultant nickel products, copper-nickel alloy (Monel) and nickel hydroxide, can be further worked-up or sold in this form.

Thus, the method according to the invention enables the nickel and copper content of the mineral to be recovered practically completely as commercially valuable products.

The invention will now be described with reference to the accompanying drawing, the single FIGURE of which is a block schematic of a preferred embodiment of the invention.

Charged to a roasting furnace 1 through a line 2 is a complex copper-nickel-concentrate, containing for example pentlandite, chalcopyrite and pyrrhotite in mixture. Roaster gases from the furnace 1 are passed, through a line 3, to suitable apparatus (not shown) for utilizing the heat content and sulphur dioxide, while the roasted products are passed to a sulphating reactor vessel 5 through a line 4. The sulphated roasted products, or calcines, are passed, through a line 6, to a leaching stage 7, where the sulphated roasted product is leached with a weak acid sulphate solution.

The leached product and leaching solution are passed from the leaching stage 7, through a line 8, to a separation apparatus 9, from which leaching solution is passed, through a line 10, to an electrowinning apparatus 11, where copper is precipitated onto copper cathodes and where the anodes used comprise a non-consumable metal, such as lead, or where consumable anodes comprising nickel and copper are used. The removal of the copper product from the system is indicated by the arrow 12. The copper-depleted electrolyte is passed, through a line 13, to an optional evaporation apparatus 14, and from there, through a line 15, to the roasting furnace 1, or, through a line 16, to the sulphating stage 5 and/or, through a line 17, to the leaching stage 7. The leaching solution is suitably divided between the lines 15, 16 and 17.

The leaching residues are passed from the separating apparatus 9, through a line 18, to a second leaching stage 19, in which noble metals are leached-out with a chlorine-containing chloride solution. The leaching solution is passed, through a line 20, to a cementation stage 21, where noble metals are precipitated out. As indicated by arrow 22, nickel or copper are added as cementation metals. Removal of noble-metal precipitates is shown by arrow 23. The leaching solution is then passed, through a line 24, to a neutralizing stage 25, to which calcium hydroxide is charged, as shown by arrow 26. Nickel-hydroxide precipitate, and possibly copper-hydroxide, is removed, as indicated by arrow 27.

Leaching residues obtained from the second leaching stage 19 are passed, via a line 28, to a drying stage 29, and from there to a melting furnace 31 through a line 30. The resultant melt, which comprises an iron-copper-nickel-alloy, is passed, through a line 32, to a reduction stage 33, to which reductant and slag former are charged via a line 34, and a fayalite slag is taken out, as indicated by arrow 35. The smelting and reduction stages may, to advantage, also be carried out in one and the same furnace unit, for example an electric-arc furnace. The alloy formed by said reduction is passed, via a line 36, to a converter 37, to which there is charged an oxygen-containing gas through a line 38, and from where there is removed a molten copper-nickel-alloy, through a line 39,. Slag is passed from the converter 37 either to a smelting furnace 31, via a line 40, or to the reduction stage 33, via a line 41. As indicated by arrow 42, a nickel-iron alloy also containing some copper can also be taken out.

EXAMPLE 108.5 tons of complex copper-nickel concentrate of the following composition were charged each day to a fluidized-bed furnace

| Cu | 12.8% | 13.9 tons |
| Ni | 5.1% | 5.5 |
| Fe | 38.5% | 41.8 |
| S | 31.4% | 34.0 |
| Residue | 12.2% | 13.3 |
| | 100% | 108.5 tons |

The concentrate was subjected to a magnetite-yielding roasting at a temperature of about 800°–1100° C. with a limited supply of oxygen; and the magnetite calcine then sulphated and leached in accordance with the invention.

In the first leaching stage, about 80% of the copper content in its steady state was leached out, and about 10% of the nickel content.

In the steady state, i.e. subsequent to returning the leaching solution to the roasting stage when copper had been recovered therefrom, all of the nickel, iron and noble metal content of the concentrate was found in the leaching residue, said residue therefore containing, after being dried

| Cu | 4.4% | 2.8 tons/day |
| Ni | 8.7% | 5.5 tons/day |
| Fe | 65.9% | 41.8 tons/day |
| Residue | 21.0% | 13.3 tons/day |
| | | 63.4 tons/day |

When the material did not contain appreciable quantities of noble metals, the dried leaching residue was passed directly to the melting stage. In the melting stage the iron content was slagged to 75% or 32.0 tons/day. An iron-copper-nickel-alloy of the following composition was obtained

| Ni | 29.7% | 5.4 tons/day |
| Cu | 15.3% | 2.8 tons/day |
| Fe | 55.0% | 10.0 tons/day |
| | | 18.2 tons/day |

Finally the iron content was slagged to about 90%, there being obtained an alloy of the following composition

| | | |
|---|---|---|
| Ni | 58.9% | 5.3 tons/day |
| Cu | 31.1% | 2.8 tons/day |
| Fe | 10.0% | 0.9 tons/day |
| | | 9.0 tons/day |

Thus, the process gave each day 9 tons of Monel, 40 tons of iron in the form of fayalite slag, and 11 tons of copper.

I claim:

1. A method of recovering copper and nickel from sulphidic minerals containing copper, nickel and iron, comprising roasting said minerals and then sulphating the roasted minerals in separate stages, and leaching the sulphated material and recovering copper from the leaching solution, characterized by returning all or part of the nickel content of the leaching solution to the roasting stage as nickel sulphate, at least partially transforming said returned nickel content to nickel oxide by splitting off in said roasting stage substantially simultaneously with transforming of any nickel sulphide content of said minerals to nickel oxide by roasting in said roasting stage, delivering said nickel oxide and any remaining nickel sulphate to the sulphating stage; and by recovering the nickel content in the form of an oxide, together with the leaching residue.

2. A method according to claim 1, characterized by recovering copper from the leaching solution by means of an electrolysis process.

3. A method according to claim 2, characterized by recirculating the leaching solution subsequent to recovering copper therefrom.

4. A method according to claim 1, characterized in that the sulphating agent used is either sulphuric acid, sulphur trioxide, metal sulphate and/or sulphur dioxide, together with oxygen.

5. A method according to claim 4, characterized in that at least part of the sulphating agent comprises leaching solution which has been recirculated subsequent to recovering copper therefrom.

6. A method according to claim 1, characterized in that the roasting stage is a magnetite yielding roasting and is effected at a temperature of 800°–1100° C.

7. A method according to claim 1, characterized in that nickel is recovered from the leaching residue by melting and reduction, to form a nickel-iron-alloy.

8. A method according to claim 7 wherein said sulphidic minerals also contain noble metals, characterized by recovering noble metal from the leaching residue prior to the melting stage.

9. A method according to claim 1 wherein said sulphide minerals also contain noble metals, characterized in that the leaching residues are smelted together with the nickel matte; and that the resultant melt is converted to nickel matte which is then worked-up to nickel metal, copper metal and noble metals.

10. A method of recovering copper and nickel from sulphidic minerals containing copper, nickel and iron, comprising:
    roasting said minerals;
    sulphating said roasted minerals in a separate stage;
    leaching said sulphated minerals to form a leaching solution and a residue;
    recovering copper from said leaching solution;
    recycling said copper-depleted leaching solution to said roasting step, whereby what nickel sulphate which was formed in said sulphating step is transformed into nickel oxide; and
    recovering the nickel content in the form of nickel oxide from said leaching residue, whereby substantially all of the nickel content of the mineral is recovered.

11. The method of claim 10, wherein said sulphating step is performed without the addition of an alkali sulphate, whereby the sulphating of the nickel content is minimized.

12. A method according to claim 1 wherein said sulphidic minerals also contain noble metals, characterized in that the leaching residues are smelted together with sulphidic nickel concentrate; and that the melt is converted to nickel matte which is then worked-up to nickel metal, copper metal and noble metals.

13. A method according to claim 1 wherein said sulphidic minerals also contain noble metals, characterized in that the leaching residues are smelted together with the nickel matte and sulphidic nickel concentrate; and that the resultant melt is converted to nickel matte which is then worked-up to nickel metal, copper metal and noble metals.

14. A method of recovering copper and nickel from sulphidic minerals containing copper, nickel and iron, comprising:
    roasting said minerals; sulphating said roasted minerals in a separate stage;
    leaching and sulphated minerals to form a leaching solution and a residue; recovering copper from said leaching solution;
    evaporating said copper-depleted leaching solution;
    recycling said evaporated copper-depleted leaching solution to said roasting step, whereby what nickel sulphate which was formed in said sulphating step is transformed into nickel oxide; and
    recovering the nickel content in the form of nickel oxide from said leaching residue, whereby substantially all of the nickel content of the mineral is recovered.

15. The method of claim 14, wherein said sulphating step is performed without the addition of an alkali sulphate, whereby the sulphating of the nickel content is minimized.

* * * * *